United States Patent
Ishida et al.

(10) Patent No.: US 9,297,078 B2
(45) Date of Patent: *Mar. 29, 2016

(54) METHOD FOR PRODUCING HARD DISK SUBSTRATE

(71) Applicant: Toyo Kohan Co., Ltd., Tokyo (JP)

(72) Inventors: Gen Ishida, Yamaguchi (JP); Nobuaki Mukai, Yamaguchi (JP); Takahiro Yoshida, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/391,296

(22) PCT Filed: Apr. 2, 2013

(86) PCT No.: PCT/JP2013/060093
§ 371 (c)(1),
(2) Date: Oct. 8, 2014

(87) PCT Pub. No.: WO2013/153992
PCT Pub. Date: Oct. 17, 2013

(65) Prior Publication Data
US 2015/0125598 A1     May 7, 2015

(30) Foreign Application Priority Data
Apr. 10, 2012   (JP) .................. 2012-089682

(51) Int. Cl.
*C23C 18/32*   (2006.01)
*G11B 5/73*    (2006.01)
(Continued)

(52) U.S. Cl.
CPC ............ *C23C 18/32* (2013.01); *C23C 18/1651* (2013.01); *C23C 18/36* (2013.01);
(Continued)

(58) Field of Classification Search
CPC   C23C 18/1651; C23C 18/1844; C23C 18/32; C23C 18/36; G11B 5/7315; G11B 5/8404; G11B 5/858
USPC ........................................................ 427/131
See application file for complete search history.

(56) References Cited

U.S. PATENT DOCUMENTS 5,141,778 A      8/1992   Yarkosky et al.
2006/0289311 A1* 12/2006  Brink et al. ................... 205/134
(Continued)

FOREIGN PATENT DOCUMENTS

JP     03-236476       10/1991
JP     2011134419 A  * 7/2011

OTHER PUBLICATIONS

Machine Translation of JP 2011134419 A.*
(Continued)

*Primary Examiner* — Dah-Wei D Yuan
*Assistant Examiner* — Jose Hernandez-Diaz
(74) *Attorney, Agent, or Firm* — McCarter & English

(57) ABSTRACT

An object of the present invention is to obtain a hard disk substrate that can have a smooth surface of a plating film through electroless NiP plating and does not have deteriorated corrosion resistance against acid solutions. A method for producing a hard disk substrate of the present invention is a method for producing a hard disk substrate with an electroless NiP plating film, the method including immersing a substrate in a first electroless NiP plating bath containing an additive with leveling action, thereby forming a lower layer of the electroless NiP plating film on a surface of the substrate, the lower layer having smaller average surface roughness than the surface; and immersing the substrate that has the lower layer of the electroless NiP plating film formed thereon through the first plating step in a second electroless NiP plating bath, thereby forming an upper layer of the electroless NiP plating film, the upper layer having corrosion resistance against acid solutions and having a thickness of greater than or equal to 4 µm.

1 Claim, 4 Drawing Sheets

(51) Int. Cl.
*G11B 5/84* (2006.01)
*C23C 18/16* (2006.01)
*G11B 5/858* (2006.01)
*C23C 18/36* (2006.01)
*G11B 5/80* (2006.01)
*C23C 18/18* (2006.01)

(52) U.S. Cl.
CPC ............ *G11B 5/7315* (2013.01); *G11B 5/8404* (2013.01); *G11B 5/858* (2013.01); *C23C 18/1844* (2013.01)

(56) References Cited

U.S. PATENT DOCUMENTS

2012/0058259 A1* 3/2012 Nye et al. .................. 427/129
2013/0196178 A1 8/2013 Mukai

OTHER PUBLICATIONS

International Search Report based on International Application No. PCT/JP2013/060093 dated May 14, 2013.

* cited by examiner

METHOD FOR PRODUCING HARD DISK SUBSTRATE

TECHNICAL FIELD

The present invention relates to a method for producing a hard disk substrate.

BACKGROUND ART

As a method for producing a hard disk substrate, there has been performed a method that includes applying electroless NiP plating to an aluminum or aluminum alloy substrate, which has been mechanically processed, to form a plating film on the surface of the substrate so that the plating film is used as a base of a magnetic film (see Patent Literature 1).

Herein, in order to achieve high recording density of a hard disk recording device, it is necessary to set the flying height of a recording/reading head as low as possible. Thus, after a plating film is formed through electroless NiP plating, a polishing step of smoothing the surface of the plating film is performed by polishing the surface with free abrasive grains.

CITATION LIST

Patent Literature

Patent Literature 1: JP H3-236476 A

SUMMARY OF INVENTION

Technical Problem

However, as the surface of the plating film formed through electroless NiP plating is quite rough, great burdens are imposed on the polishing step. Further, as the removal thickness with polishing is also large, the thickness of the plating film should also be increased, which in turn could decrease the productivity and increase environmental burdens.

In view of the foregoing, it is desired that the surface of the plating film formed through electroless NiP plating be as smooth as possible to reduce burdens on the polishing step. In a method of forming a plating film on a printed board or the like, for example, a brighter, such as an organosulfur compound, is added into an electroless plating bath to obtain a plating film with a smooth surface.

However, a plating film containing sulfur typically has low corrosion resistance against acid solutions, and in particular, when a method for producing a hard disk substrate in which a strong-acid polishing agent is used in a polishing step is used, it is concerned that defects such as corrosion pits may be generated on the surface of the resulting plating film. Thus, the techniques for printed boards and the like cannot be applied directly. Further, when the corrosion resistance against acid solutions of a plating film is low, it is concerned that an excess amount of Ni in the plating film may preferentially elute even while strong acid washing is performed, which in turn could cause failure in the following steps for the hard disk substrate.

The present invention has been made in view of the foregoing, and it is an object of the present invention to supply a hard disk substrate that can have a smooth surface of a plating film through electroless NiP plating and does not have deteriorated corrosion resistance against acid solutions.

Solution to Problem

A method for producing a hard disk substrate of the present invention for solving the above problem is a method for producing a hard disk substrate with an electroless NiP plating film, including a first plating step of immersing a substrate in a first electroless NiP plating bath containing an additive with leveling action, thereby forming a lower layer of the electroless NiP plating film on a surface of the substrate, the lower layer having smaller average surface roughness than the surface; and a second plating step of immersing the substrate that has the lower layer of the electroless NiP plating film formed thereon through the first plating step in a second electroless NiP plating bath, thereby forming an upper layer of the electroless NiP plating film, the upper layer having corrosion resistance against acid solutions and having a thickness of greater than or equal to 4 μm.

Advantageous Effects of Invention

According to the aforementioned method for producing a hard disk substrate, the lower layer of the electroless NiP plating film is formed on the surface of a substrate by immersing the substrate in a first electroless NiP plating bath containing an additive with leveling action, such as an organosulfur compound. Thus, the surface roughness of the lower layer can be suppressed, and the surface of the lower layer can thus be smooth.

In addition, as the upper layer of the electroless NiP plating film is formed on the smoothed surface of the lower layer by immersing the substrate, which has the lower layer of the electroless NiP plating film formed thereon, in a second electroless NiP plating bath with corrosion resistance against acid solutions, the surface roughness of the upper layer can be suppressed, and the surface of the upper layer can thus be smooth. Further, as the surface of the lower layer is covered with the upper layer with corrosion resistance against acid solutions, corrosion resistance against acid solutions will not deteriorate in the polishing step or the washing step.

Thus, burdens on the polishing step can be reduced, and the productivity of hard disk substrates can be improved. Further, as the amount of a polishing waste liquid that is discharged in the polishing step can be reduced, the removal thickness with polishing can be suppressed, and the thickness of the plating film can be reduced, environmental burdens can also be reduced.

According to the aforementioned method for producing a hard disk substrate of the present invention, the upper layer of the electroless NiP plating film is formed to a thickness of greater than or equal to 4 μm. Thus, generation of pits, which are recess defects, in the upper layer of the electroless NiP plating film in the polishing step can be suppressed. Thus, it is possible to obtain a smooth hard disk substrate and avoid generation of corrosion in the lower layer of the plating film starting from the pits generated in the upper layer of the electroless NiP plating film, which could otherwise deteriorate the corrosion resistance against acid solutions. In addition, according to the present invention, as the number of pits that are generated in the upper layer of the electroless NiP plating film can be reduced, a decrease in the recording capacity of a hard disk recording device can be avoided.

DESCRIPTION OF EMBODIMENTS

Figure 1:
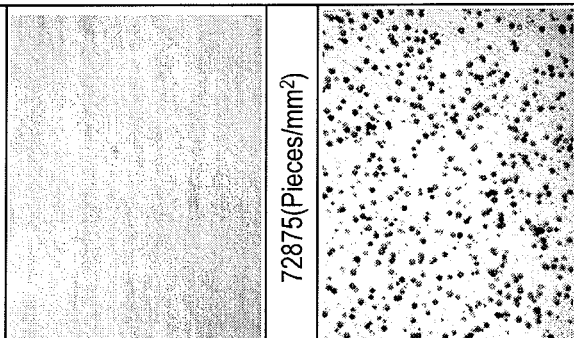
FIG. 1 is a diagram showing the measurement results in Example 1-1 and Comparative Examples 1-1 and 1-2.

Hereinafter, the present embodiment will be described in detail.

A method for producing a hard disk substrate includes a substrate forming step of forming a substrate by grinding an aluminum blank material, a plating step of applying electroless NiP plating to the substrate to form an electroless NiP plating film on the surface of the substrate, a polishing step of polishing the surface of the substrate having the electroless NiP plating film formed thereon to obtain a mirror surface, and a washing step of washing the polished plating film.

Among the aforementioned steps, the plating step can include (1) a degreasing step, (2) water washing, (3) etching treatment, (4) water washing, (5) desmutting treatment, (6) water washing, (7) first zincate treatment, (8) water washing, (9) de-zincate treatment, (10) water washing, (11) secondary zincate treatment, (12) water washing, (13) electroless NiP plating, (14) water washing, (15) drying, and (16) annealing. The (13) electroless NiP plating can be performed in two stages including a first plating step and a second plating step.

In the first plating step, the substrate is immersed in a first electroless NiP plating bath containing an additive with leveling action so that a lower layer of an electroless NiP plating film is formed on the surface of the substrate. Through such a process, an electroless NiP plating film with smaller average surface roughness than that of the aluminum blank material can be formed. It should be noted that an organosulfur compound can be used for the additive with leveling action.

It is considered that such an additive with leveling action will deposit on projections of the aluminum blank material with irregularities, and delay the growth of electroless NiP plating at the projections than at other portions, and thus has the action of reducing the influence of irregularities of the aluminum blank material, so that a smooth plating film can be obtained.

In the second plating step, the substrate, which has the lower layer of the electroless NiP plating film formed thereon through the first plating step, is immersed in a second electroless NiP plating bath with corrosion resistance against acid solutions, whereby an upper layer of the electroless NiP plating film with corrosion resistance against acid solutions is formed. The upper layer of the electroless NiP plating film is formed to a thickness of greater than or equal to 4 μm. In order to form an electroless NiP plating film with corrosion resistance against acid solutions, a plating bath not containing an organosulfur compound added thereto can be used.

It should be noted that the phrase "having corrosion resistance against acid solutions" herein means having at least about the same degree of corrosion resistance against acid solutions as those of the conventionally used electroless NiP plating films. To this end, an organosulfur compound is preferably not positively added into the plating path, but inclusion of the amount of an organosulfur compound due to contamination that will not influence the corrosion resistance against acid solutions is acceptable.

In the conventional electroless NiP plating, a single layer of an electroless NiP plating film is formed through a single plating step. Thus, the plating thickness is about 10 to 15 μm, for example, which is thicker than the upper layer of the electroless NiP plating film in this embodiment. Thus, even if pinholes are generated in the beginning of deposition of plating, there is a low possibility that the pinholes will appear as pits on the surface of the plating film as the pinholes may be filled while a plating film grows. Further, even if the pinholes remain as voids in the plating film, there is a low possibility that the pinholes may appear as pits on the surface of the plating film after a polishing step as the pinholes are present around the interface with the aluminum blank material.

Meanwhile, in the electroless NiP plating in this embodiment, the lower layer is formed through the first plating step and the upper layer is formed through the second plating step, whereby an electroless NiP plating film with a two-layer structure of the upper and lower layers is formed.

In such a method for producing a two-layer structure, however, there is a possibility that in the period during transition from the first plating step of forming the lower layer to the second plating step of forming the upper layer, an oxide film may be formed on the surface of the lower layer of the plating film, which in turn may delay deposition of electroless NiP plating of the upper layer at inactive portions where the oxide film is formed, so that pinholes and voids may be generated, and a number of pit defects may thus be generated on the substrate surface after the polishing step.

Thus, when pinholes and voids are generated around the interface between the upper layer and the lower layer in the beginning of deposition of plating of the upper layer due to the presence of inactive portions such as an oxide film on the surface of the lower layer of the plating film, it is concerned that the pinholes may appear as pits on the surface of the upper layer of the plating film, and the voids may appear as pits on the surface of the upper layer of the plating film after a polishing step. In particular, when the thickness of the upper layer of the electroless NiP plating film is less than or equal to 4 μm, it is concerned that a number of pits may be generated in the upper layer of the electroless NiP plating film, and corrosion of the lower layer of the plating film may be generated starting from the pits, which could deteriorate the corrosion resistance against acid solutions, or the number of portions where data cannot be recorded after a magnetic recording layer is completed may increase, which could decrease the recording capacity of a hard disk recording device.

Thus, in this embodiment, the upper layer of the electroless NiP plating film is formed to a thickness of greater than or equal to 4 μm to suppress the phenomenon that pinholes and voids, which have been generated due to an oxide film generated around the interface between the upper layer and the lower layer in the beginning of deposition of plating of the upper layer, appear as pits on the surface of the upper layer of the plating film after the upper layer of the plating film is formed or after polishing is performed. Thus, it is possible to obtain a smooth hard disk substrate, and avoid generation of corrosion of the lower layer of the plating film starting from pits in the upper layer of the electroless NiP plating film, which could otherwise deteriorate the corrosion resistance against acid solutions. Further, a decrease in the recording capacity of a hard disk recording device can be avoided.

For the first and second electroless NiP plating baths, a water-soluble nickel salt is used as a source of supply of nickel ions. As such a water-soluble nickel salt, nickel sulfate, nickel chloride, nickel carbonate, nickel acetate, nickel sulfamate, or the like can be used. The concentration of metallic nickel in the plating bath is preferably 1 to 30 g/L.

As a complexing agent, two or more of dicarboxylic acid; an alkali salt thereof, for example, tartaric acid, malic acid, citric acid, succinic acid, malonic acid, glycolic acid, gluconic acid, oxalic acid, phthalic acid, fumaric acid, maleic acid, or lactic acid; sodium salt thereof; potassium salt thereof; and ammonium salt thereof are preferably used. Preferably, at least one of them is oxydicarboxylic acid. The concentration of the complexing agent is preferably 0.01 to 2.0 mol/L.

As a reducing agent, hypophosphorous acid or hypophosphite such as sodium hypophosphite or potassium hypophosphite is preferably used. The concentration of the reducing agent is preferably 5 to 80 g/L.

In the first plating step, electroless NiP plating is preferably performed using a first electroless NiP plating bath containing a brighter, such as an organosulfur compound, added thereto as an additive with leveling action in order to smooth the surface of the electroless NiP plating film as a lower layer. Through such a process, an electroless NiP plating film with smaller average surface roughness than that of the aluminum blank material can be formed.

Any organosulfur compound that contains sulfur atoms in the structural formula can be used. For example, thiourea, sodium thiosulfate, sulfonate, isothiazolone compound, sodium lauryl sulfate, 2,2'-dipyridyl disulfide, 2,2'-dithiodibenzoic acid, bis(disulfide), or the like can be used either alone or in combination of two or more. More preferably, an organosulfur compound that contains nitrogen, such as thiourea, isothiazolone compound, 2,2'-dipyridyl disulfide, or bis(disulfide) is preferably used. The amount of addition of the organosulfur compound is preferably 0.01 to 20 ppm, and particularly preferably, 0.1 to 5 ppm. When the amount of addition is too small, there will be no leveling effect for the plating film, while when the amount of addition is too large, no higher effect is recognized.

A brighter like the aforementioned organosulfur compound is less toxic than brighter containing Cd, As, Tl, and the like, and thus are often suitable for practical use.

The first electroless NiP plating bath preferably further contains a pH controlling agent for acids, alkalis, salts, and the like, a preservative for avoiding generation of mold in the plating bath while the bath contains compounds therein, a buffer agent for suppressing fluctuations of pH, a surfactant for suppressing generation of pinholes, and a stabilizer for suppressing decomposition in the plating bath.

In the second plating step, electroless NiP plating is preferably performed using a second electroless NiP plating bath not containing an organosulfur compound. The thickness of the upper layer of the electroless NiP plating film formed in the second plating step is greater than or equal to 4 μm. The second electroless NiP plating bath is the one that is typically used in the production of hard disk substrates, and has corrosion resistance against acid solutions against a polishing step that is performed after the plating step. Further, the second electroless NiP plating bath also has corrosion resistance against a strong acid washing step.

According to the aforementioned method for producing a hard disk substrate, a substrate is immersed in the first electroless NiP plating bath containing an additive with leveling action, such as an organosulfur compound, to form a lower layer of an electroless NiP plating film on the surface of the substrate. Thus, the surface roughness of the lower layer can be suppressed, and the surface of the lower layer can thus be smooth.

Next, the substrate, which has the lower layer of the electroless NiP plating film formed thereon, is immersed in a second electroless NiP plating bath with corrosion resistance against acid solutions to form an upper layer of the electroless NiP plating film on the smoothed surface of the lower layer. Thus, the surface roughness of the upper layer can be suppressed, and the surface of the upper layer can thus be smooth. Further, as the surface of the lower layer is covered with the upper layer with corrosion resistance against acid solutions, there is no possibility that the corrosion resistance against acid solutions will deteriorate in the polishing step or the washing step.

Thus, as a smooth hard disk substrate can be obtained, burdens on the polishing step can be reduced, and the productivity of hard disk substrates can thus be improved. Further, as the amount of a polishing waste liquid that is discharged in the polishing step can be reduced, the removal thickness with polishing can be suppressed, and the thickness of the plating film can be reduced, environmental burdens can also be reduced.

According to the aforementioned method for producing a hard disk substrate, the upper layer of the electroless NiP plating film is formed to a thickness of greater than or equal to 4 μm. Therefore, it is possible to suppress the phenomenon that pinholes and voids, which have been generated around the interface between the upper layer and the lower layer in the beginning of deposition of plating of the upper layer, appear as pits on the surface of the upper layer of the plating film after the upper layer of the plating film is formed or after polishing is performed. Thus, it is possible to obtain a smooth hard disk substrate and avoid generation of corrosion from the pits, which could otherwise deteriorate the corrosion resistance against acid solutions. Further, a decrease in the recording capacity of a hard disk recording device can be avoided.

EXAMPLES

Although the present invention will be hereinafter described in detail with reference to examples and comparative examples, the present invention is not limited to the following examples.

Example 1

Example 1 was implemented to observe the state of the surface roughness of the upper layer after the first plating step and the second plating step.

<Pretreatment Step>

A commercially available 3.5-inch aluminum substrate (95 mm—an inner diameter φ of 25 mm) with an average surface roughness of Ra=15 nm was subjected to degreasing treatment at 50° C. for 2 minutes using a degreasing liquid containing known soda phosphate and surfactant. Then, the substrate was subjected to etching treatment at 70° C. for 2 minutes using a known etching solution containing sulfuric acid and phosphoric acid.

Further, desmutting treatment was performed at 20° C. for 30 seconds using nitric acid, and first zincate treatment was performed at 20° C. for 30 seconds using a known zincate treatment solution. Next, de-zincate treatment was performed at 20° C. for 30 seconds using nitric acid, and then, secondary zincate treatment was performed at 20° C. for 30 seconds.

Plating Conditions

Example 1-1

In the first plating step of forming a lower layer on the surface of a substrate, plating treatment was performed to form a plating film with a thickness of 10 μm at 85° C. for 90 minutes using a known malic acid-succinic acid-based electroless NiP plating bath containing 1 ppm 2,2'-dipyridyl disulfide added thereto as an organosulfur compound. The surface roughness of the electroless NiP plating film was measured with an atomic force microscope (AFM) produced by Veeco (roughness is indicated as the average roughness Ra of 10 μm square). Consequently, the value of the surface roughness was 2.3 nm.

Then, the surface of the lower layer of the electroless NiP plating film was washed. Then, in the second plating step of forming an upper layer, plating treatment was performed to form a plating film with a thickness of 2 μm at 85° C. for 20 minutes using a known malic acid-succinic acid-based electroless NiP plating bath not containing an organosulfur compound added thereto, whereby a plating film with a total thickness of 12 μm was formed on the surface of the substrate.

Comparative Example 1-1

Plating treatment was performed to form a plating film with a thickness of 12 μm at 85° C. for 120 minutes using a known malic acid-succinic acid-based electroless NiP plating bath not containing the aforementioned organosulfur compound added thereto. That is, plating treatment was performed using an electroless NiP plating bath that does not contain an organosulfur compound and has corrosion resistance against acid solutions.

Comparative Example 1-2

Plating treatment was performed to form a plating film with a thickness of 12 μm at 85° C. for 120 minutes using a known malic acid-succinic acid-based electroless NiP plating bath containing 1 ppm of the organosulfur compound added thereto. That is, plating treatment was performed using an electroless NiP plating bath containing an organosulfur compound.

(Measurement Results)

The surface roughness of each of the electroless NiP plating films of Example 1, Comparative Example 1-1, and Comparative Example 1-2 was measured with an atomic force microscope (AFM) produced by Veeco (roughness is indicated as the average roughness Ra of 10 μm square).

Further, the surface of each plating film was imaged with an optical microscope for visual check. Corrosion resistance against acid solutions was measured by immersing each of the electroless NiP plating films of Example 1-1, Comparative Example 1-1, and Comparative Example 1-2 in nitric acid (with a concentration of 30% and a temperature of 40° C.) for 5 minutes, and imaging the surface of each film with an optical microscope to count the number of corrosion pits in the field of view.

FIG. 1 is a diagram showing the measurement results of Example 1-1 and Comparative Examples 1-1 and 1-2.

In Example 1-1, the surface roughness Ra after the plating is 2.6 nm, and the number of corrosion pits is 1250 (pieces/mm$^2$). In Comparative Example 1-1, the surface roughness Ra after the plating is 14.8 nm, and the number of corrosion pits is 1125 (pieces/mm$^2$). In Comparative Example 1-2, the surface roughness Ra after the plating is 2.1 nm, and the number of corrosion pits is 72875 (pieces/mm$^2$).

In Comparative Example 1-1, plating treatment was performed using an electroless NiP plating bath with corrosion resistance against acid solutions in the plating step. Thus, the number of corrosion pits is less than that in Example 1. However, as an organosulfur compound is not contained, the surface roughness Ra is greater than that in Example 1-1, and a plurality of minute irregularities can be observed on the surface of the plating film in FIG. 1. Thus, it is predicted that great burdens will be imposed on the polishing step in Comparative Example 1-1.

In Comparative Example 1-2, plating treatment was performed using an electroless NiP plating bath containing an organosulfur compound in the plating step. Thus, the surface roughness Ra is smaller than that in Example 1-1, and irregularities cannot be observed on the surface in FIG. 1. However, it is seen that the number of corrosion pits is far larger than that in Example 1-1, and the corrosion resistance against acid solutions is thus low. Thus, it is predicted that defects such as corrosion pits will be generated in the polishing step, and it is also predicted that an excess amount of Ni in the NiP plating film will elute in the washing step, which could influence the following steps for the hard disk substrate.

It is found that in comparison with Comparative Examples 1-1 and 1-2, the surface roughness Ra after the plating of Example 1 is smaller and smoother, and the film has a small number of corrosion pits and thus has higher corrosion resistance against acid solutions.

Example 1-2

Samples with samples numbers 1-6 were produced by preparing a plurality of types of organosulfur compounds and performing plating treatment under the same plating conditions as those in Example 1-1. Table 1 below is a table showing the name, the structural formula, and the amount of addition of each organosulfur compound.

TABLE 1

| Sample Number | Name of Additive | Structural Formula | Amount of Addition (ppm) |
| --- | --- | --- | --- |
| 1 | sodium thiosulfate | $Na_2S_2O_2$ | 0.75 |
| 2 | thiourea | $CS(NH_2)_2$ | 1 |
| 3 | sodium lauryl sulfate | $C_{12}H_{25}SO_3Na$ | 2 |
| 4 | isothiazolone compound | $C_4H_4NSClO$ | 0.75 |
| 5 | 2,2'-dipyridyl disulfide | $C_{10}H_{18}N_2S_2$ | 1 |
| 6 | naphthalenesulfonate condensate | $(C_{10}H_4SO_3Na)n$ | 200 |

Then, the surface roughness of the electroless NiP plating film was measured with an atomic force microscope (AFM) produced by Veeco (roughness is indicated as the average roughness Ra of 10 μm square) as in Example 1-1.

Figure 2:
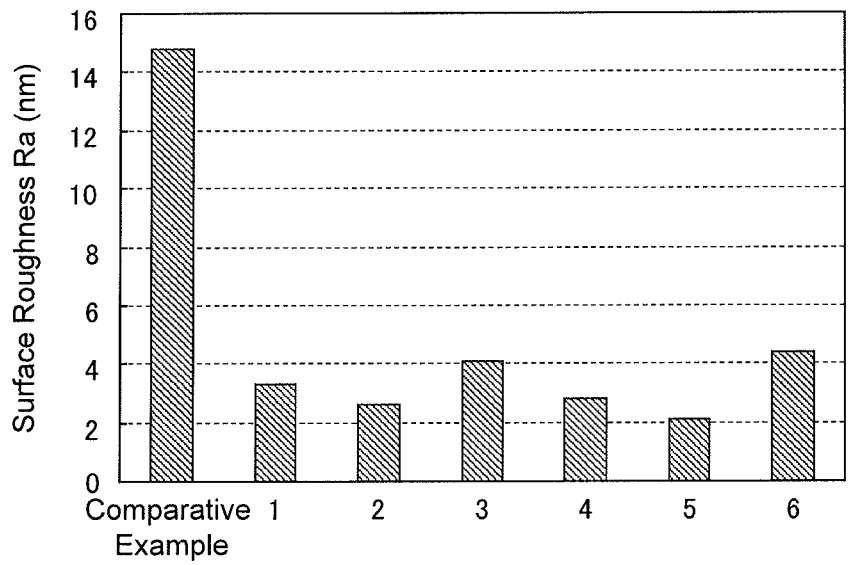
FIG. 2 is a diagram showing the measurement results in Example 1-2.

FIG. 2 is a diagram showing the measurement results of the surface roughness of each sample and the comparative example.

The comparative example in FIG. 2 corresponds to Comparative Example 1-1 described above. It is seen that the film of the comparative example has large surface roughness (Ra) (14.8 nm) as an organosulfur compound is not added, and has a rougher surface than the samples with Sample Numbers 1-6. Meanwhile, it is seen that the present example in which an organosulfur compound is added, that is, each of the samples with Sample Numbers 1-6 has small surface roughness (Ra), and has a smoother surface than the film of the comparative example. Among them, the samples with Sample Numbers 2, 4, and 5, in particular, have small surface roughness (Ra), and have a significantly high leveling effect. This is considered to be due to the influence of nitrogen contained in the organosulfur compound.

Examples 1-3

Samples were produced using organosulfur compounds, which were found to have a particularly high leveling effect in Example 1-2 described above, that is, dipyridyl disulfide, thiourea, and isothiazolone, as additives. Then, (1) surface roughness, (2) the heights of nodules, and (3) waviness that serve as the indices of smoothness were measured and effects thereof were confirmed.

(1) Measurement of the Surface Roughness

Samples were produced by changing the amount of addition of each additive by 0.25 ppm in the range of 0 to 1.5 ppm. Then, the surface roughness of the electroless NiP plating film of each sample was measured with an atomic force microscope (AFM) produced by Veeco (roughness is indicated as the average roughness Ra of 10 μm square) as in Example 1-1. Table 2 below is a table showing the measurement results of the surface roughness of each sample, and FIG. 3 is a graph of the results in Table 2.

TABLE 2

| Amount of Addition (ppm) | dipyridyl disulfide (nm) | thiourea (nm) | isothiazolone (nm) |
|---|---|---|---|
| 0.00 | 14.9 | 13.80 | 14.11 |
| 0.25 | 9.10 | 7.22 | 6.58 |
| 0.50 | 6.50 | 6.77 | 3.44 |
| 0.75 | 3.02 | 3.94 | 3.38 |
| 1.00 | 2.56 | 3.72 | 3.41 |
| 1.25 | 2.55 | 3.90 | — |
| 1.50 | 2.87 | — | 3.26 |

Figure 3:
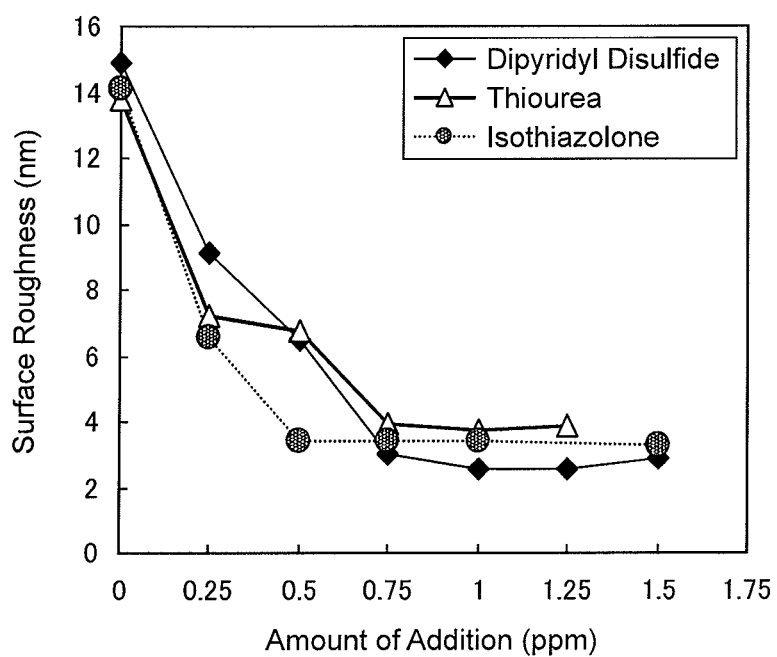
FIG. 3 is a diagram showing the measurement results of the surface roughness in Example 1-3.

As shown in Table 2 and FIG. 3, it is seen that in comparison with the surface roughness of a sample produced without an organosulfur compound added thereto (i.e., the amount of addition=0.00 ppm), the surface roughness of a sample produced with an organosulfur compound added thereto (0.25 to 1.50 ppm), for example, thiourea, is reduced to about ⅓ at the maximum.

(2) Heights of Nodules

In this example, a sample produced with 1.0 ppm dipyridyl disulfide added thereto, a sample produced with 0.75 ppm thiourea added thereto, and a sample produced with 0.5 ppm isothiazolone added thereto were produced. Then, the heights of nodules and the diameters of nodules were measured using an ultra-depth shape measuring microscope ("VK-851" produced by Keyence Corporation). As a comparative example, the heights of nodules and the diameters of nodules of Comparative Example 1-1 described above were also measured.

Figure 4:
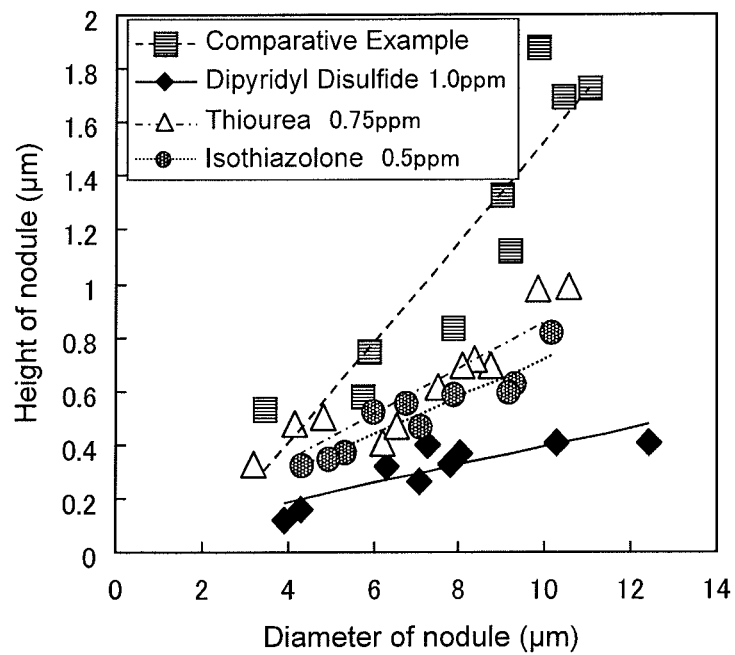
FIG. 4 is a diagram showing the measurement results of the diameters of nodules and the heights of nodules in Example 1-3.

Table 3 below is a table showing the measurement results of the heights of nodules and the diameters of nodules of each example and the comparative example. FIG. 4 is a diagram showing the correlation among the measurement results.

TABLE 3

| Comparative Example | | dipyridyl disulfide 1.0 ppm | | thiourea 0.75 ppm | | isothiazolone 0.5 ppm | |
|---|---|---|---|---|---|---|---|
| Height (μm) | Diameter (μm) | Height (μm) | Diameter (μm) | Height (μm) | Diameter (μm) | Height (μm) | Diameter (μm) |
| 3.46 | 0.53 | 7.81 | 0.33 | 9.83 | 0.98 | 6.01 | 0.52 |
| 11.05 | 1.73 | 7.28 | 0.4 | 10.55 | 0.99 | 7.87 | 0.58 |
| 5.86 | 0.75 | 7.09 | 0.26 | 8.76 | 0.69 | 7.11 | 0.46 |
| 5.74 | 0.58 | 8.03 | 0.37 | 8.34 | 0.72 | 9.34 | 0.62 |
| 10.42 | 1.7 | 4.3 | 0.16 | 6.22 | 0.41 | 9.17 | 0.59 |
| 9.84 | 1.88 | 6.31 | 0.32 | 7.48 | 0.61 | 5.33 | 0.37 |
| 7.82 | 0.84 | 12.44 | 0.41 | 8.06 | 0.69 | 4.36 | 0.32 |
| 9.16 | 1.12 | 10.26 | 0.41 | 6.54 | 0.47 | 10.18 | 0.81 |
| 9 | 1.33 | 3.9 | 0.12 | 3.22 | 0.33 | 4.98 | 0.34 |
| | | | | 4.83 | 0.5 | 6.77 | 0.55 |
| | | | | 4.16 | 0.48 | | |

As shown in FIG. 4, it is seen that in each example in which an organosulfur compound is added, the height of each nodule with respect to the diameter of the nodule is reduced than that of the comparative example in which an organosulfur compound is not added.

(3) Measurement of Waviness

Samples were produced by changing the amount of addition of each additive by 0.25 ppm in the range of 0 to 1.5 ppm. Then, waviness (Wa) of the surface of each sample at a wavelength of 5 mm was measured using a flatness measuring apparatus ("Opti flat" produced by KLA-Tencor). The waviness (Wa) was obtained by calculating the mean absolute value of the height (Z) at a wavelength of greater than or equal to 5 mm, and was calculated on the basis of the arithmetical mean waviness (Wa) indicated by JISB0601. Table 4 below is a table showing the measurement results of the waviness of the surface of each sample in accordance with the amount of addition, and FIG. 5 is a graph of the results in Table 4.

TABLE 4

| Amount of Addition (ppm) | dipyridyl disulfide (nm) | thiourea (nm) | isothiazolone (nm) |
|---|---|---|---|
| 0.00 | 1.53 | 1.56 | 1.51 |
| 0.25 | 1.46 | 1.45 | 1.41 |
| 0.50 | 1.36 | 1.46 | 1.46 |
| 0.75 | 1.38 | 1.50 | 1.39 |
| 1.00 | 1.37 | 1.42 | 1.38 |
| 1.25 | 1.35 | 1.47 | — |
| 1.50 | 1.38 | — | 1.41 |

Figure 5:
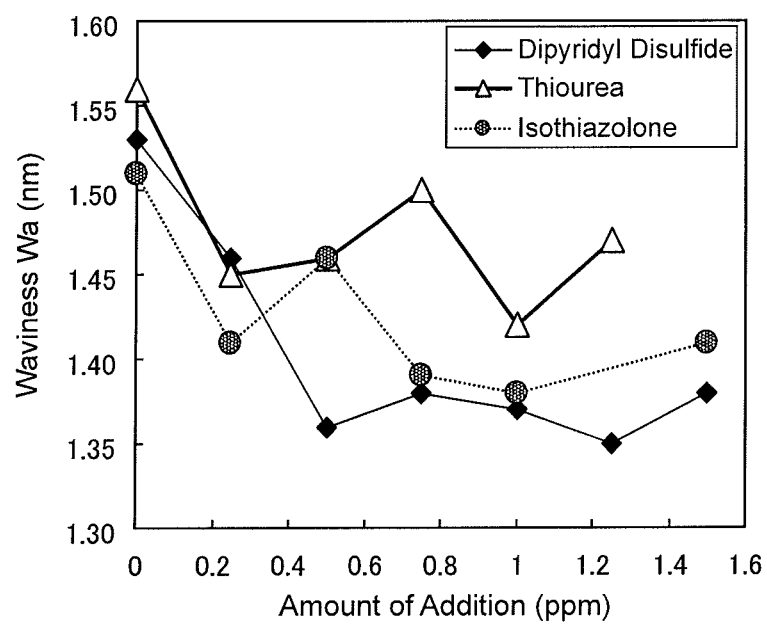
FIG. 5 is a diagram showing the measurement results of waviness in Example 1-3.

As shown in Table 4 and FIG. 5, it was found that in comparison with a sample produced without an organosulfur compound added thereto (i.e., the amount of addition=0.00 ppm), a sample produced with an organosulfur compound added thereto (0.25 to 1.50 ppm) has reduced waviness and a smoother surface.

Accordingly, it was found that with respect to all of the indices: (1) surface roughness, (2) the heights of nodules, and (3) waviness, a sample produced with a nitrogen-containing organosulfur compound added thereto has a higher leveling effect than a sample produced without an organosulfur compound added thereto. Accordingly, it is considered that burdens on the polishing step can be reduced, and the productivity of hard disk substrates can thus be improved.

Example 2

Example 2 was implemented to observe the state of generation of pits that are considered to be generated due to an oxide film generated on the surface of the lower layer of the plating film when plating is performed through the first plating step and the second plating step.

<Pretreatment Step>

A commercially available 3.5-inch aluminum substrate with an average surface roughness of Ra=15 nm was subjected to degreasing treatment at 50° C. for 2 minutes using a degreasing liquid containing known soda phosphate and surfactant. Then, the substrate was subjected to etching treatment at 70° C. for 2 minutes using a known etching solution containing sulfuric acid and phosphoric acid.

Next, desmutting treatment was performed at 20° C. for 30 seconds using nitric acid, and first zincate treatment was performed at 20° C. for 30 seconds using a known alkaline zincate treatment solution. Further, de-zincate treatment was performed at 20° C. for 30 seconds using nitric acid, and then, secondary zincate treatment was performed at 20° C. for 30 seconds using the same zincate treatment solution as that in the first zincate treatment.

Plating Step

Example 2-1

In the first plating step, plating treatment was performed at 85° C. for 120 minutes using an electroless Ni—P plating solution not containing an organosulfur compound added thereto, thereby forming a lower layer of an electroless NiP plating film with a thickness of 10 μm. Then, the surface of the obtained lower layer of the electroless NiP plating film was washed with pure water, and further, plating treatment was performed at 85° C. in the second plating step using an electroless Ni—P plating solution not containing an organosulfur compound added thereto, thereby forming an upper layer of the electroless NiP plating film with a thickness of 4 μm on the lower layer of the electroless NiP plating film. That is, the lower layer of the electroless NiP plating film was formed to a thickness of 10 μm, and the upper layer thereof was formed to a thickness of 4 μm.

Example 2-2

Plating treatment was performed with the same method as that in Example 2-1 to form an upper layer of a plating film with a thickness of 5 μm.

Example 2-3

Plating treatment was performed with the same method as that in Example 2-1 to form an upper layer of a plating film with a thickness of 6 μm.

Example 2-4

Plating treatment was performed with the same method as that in Example 2-1 to form an upper layer of a plating film with a thickness of 9 μm.

Plating treatment was performed with the same method as that in Example 2-1 to form an upper layer of a plating film with a thickness of 3 μm.

Comparative Example 2-2

Plating treatment was performed at 85° C. for 120 minutes using an electroless Ni—P plating solution not containing an organosulfur compound added thereto, thereby forming a single-layer electroless NiP plating film with a thickness of 10 μm.

The present invention is directed to a production method for solving the problem of pits that are generated when an electroless NiP plating film with a two-layer structure is formed. The cause of the generation of such pits is an oxide film that is formed on the surface of the lower layer of the plating film as described above, and does not depend on the smoothness of the lower layer of the electroless NiP plating film. Thus, in this example, an electroless NiP plating bath not containing an additive with leveling action was used to form the lower layer of the electroless NiP plating film as a simulation test.

<Polishing Step>

The surface of each of the electroless NiP plating films obtained in Examples 2-1 to 2-4 and Comparative Examples 2-1 and 2-2 was subjected to a fine polishing process in two stages, using an urethane foam polishing pad and a polishing solution containing free abrasive grains dispersed therein, so that a mirror surface was obtained. In that case, a polishing solution containing dispersed therein alumina abrasive grains with a high processing speed was used in the first-stage polishing, and a polishing solution containing dispersed therein colloidal silica abrasive grains with a further smaller grain size was used in the second-stage polishing. The film was polished to a depth of 1.6 μm from the surface using such polishing methods, and then was washed with water and dried.

<Measurement Results>

Figure 6:
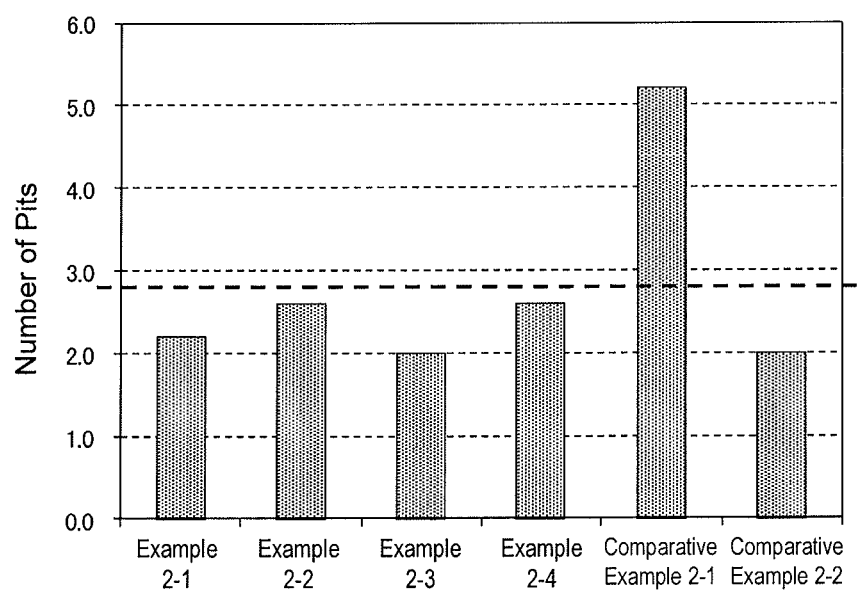
FIG. 6 is a graph showing the measurement results of the number of pits in Example 2-1 to Example 2-4 and Comparative Examples 2-1 and 2-2.

To measure the number of pits on the surface of the electroless NiP plating film after the aforementioned polishing process, the number of pits with a width of greater than or equal to 0.2 μm that were present in the entire region in the radius range of 13.5 mm to 47.2 mm on the surface of a single side of the 3.5-inch hard disk substrate was measured using a magnetic disk surface testing apparatus ("RS1390" produced by Hitachi High-Technologies Corporation). Table 5 and FIG. 6 show the measurement results thereof.

TABLE 5

|  | Plating Thickness of Lower Layer (μm) | Plating Thickness of Upper Layer (μm) | Number of Pits (Pieces/Plane) |
|---|---|---|---|
| Example 2-1 | 10 | 4 | 2.2 |
| Example 2-2 | 10 | 5 | 2.6 |
| Example 2-3 | 10 | 6 | 2.0 |
| Example 2-4 | 10 | 9 | 2.6 |
| Comparative Example 2-1 | 10 | 3 | 5.2 |
| Comparative Example 2-2 | 10 | 0 | 2.0 |

In Comparative Example 2-1 in which the thickness of the upper layer of the plating film is 3 μm, the number of pits is 5.2 (pieces/plane), which is larger than that when the thickness of the upper layer of the plating film is greater than or equal to 4 μm. Thus, it is considered that the number of writing error portions when the final disk is inserted into a hard disk drive will increase.

Meanwhile, in Comparative Example 2-2 in which the plating film has a single layer with a thickness of 10 μm, the number of pits is 2.0 (pieces/plane). In Comparative Example 2-2, the thickness of the plating film from the interface with a base is thick (10 μm). Thus, the cause of the generation of the pits is considered to be something other than defects originating from an oxide film. For example, the cause is considered to be, though not limited thereto, contamination in the plating solution. When the number of pits in Comparative Example 2-2 is compared with those in Examples 2-1 to 2-4, the numbers are almost the same. Thus, the cause of the generation of the pits is considered to be something other than defects originating from an oxide film that is generated on the surface of the lower layer. Accordingly, it is found that pits originating from an oxide film, which would otherwise be generated when an electroless NiP plating film is formed in a two-layer structure of upper and lower layers, can be suppressed, and generation of pits can be suppressed when the upper layer of the plating film is formed to a thickness of greater than or equal to 4 μm.

The invention claimed is:
1. A method for producing a hard disk substrate with an electroless NiP plating film, comprising:
a first plating step of immersing a substrate in a first electroless NiP plating bath containing an additive with leveling action, thereby forming a lower layer of the elec- troless NiP plating film on a surface of the substrate, wherein the additive is an organosulfur compound, the lower layer having smaller average surface roughness than the surface; and a second plating step of immersing the substrate that has the lower layer of the electroless NiP plating film formed thereon through the first plating step in a second electroless NiP plating bath, thereby forming an upper layer of the electroless NiP plating film directly on the lower layer, the upper layer having corrosion resistance against acid solutions and having a thickness of greater than or equal to 4 μm.

* * * * *